(12) United States Patent
Bae et al.

(10) Patent No.: US 9,111,651 B2
(45) Date of Patent: Aug. 18, 2015

(54) HEAT EXCHANGER FOR PASSIVE RESIDUAL HEAT REMOVAL SYSTEM

(71) Applicant: KOREA ATOMIC ENERGY RESEARCH INSTITUTE, Daejeon (KR)

(72) Inventors: Young Min Bae, Daejeon (KR); Young In Kim, Daejeon (KR); Keung Koo Kim, Daejeon (KR); Seung Yeop Yoo, Daejeon (KR)

(73) Assignee: KOREA ATOMIC ENERGY RESEARCH INSTITUTE (KR)

( * ) Notice: Subject to any disclaimer, the term of this patent is extended or adjusted under 35 U.S.C. 154(b) by 463 days.

(21) Appl. No.: 13/845,531

(22) Filed: Mar. 18, 2013

(65) Prior Publication Data

US 2013/0343504 A1    Dec. 26, 2013

(30) Foreign Application Priority Data

Jun. 20, 2012  (KR) .......................  10-2012-0066074

(51) Int. Cl.
*G21C 15/18*  (2006.01)
*G21C 1/32*  (2006.01)

(52) U.S. Cl.
CPC ................ *G21C 15/18* (2013.01); *G21C 1/326* (2013.01); *Y02E 30/40* (2013.01)

(58) Field of Classification Search
USPC .......................................... 376/282, 405, 404
See application file for complete search history.

(56) References Cited

U.S. PATENT DOCUMENTS

| 4,487,742 | A  | * | 12/1984 | Bret ............................. 376/298 |
| 4,592,888 | A  | * | 6/1986  | Cornu et al. .................. 376/299 |
| 6,795,518 | B1 | * | 9/2004  | Conway et al. ............... 376/283 |

FOREIGN PATENT DOCUMENTS

| JP | 2004020376 | 1/2004 |
| KR | 1020090102079 | 9/2009 |
| KR | 100935089 | 12/2009 |
| KR | 1020100090990 | 8/2010 |
| KR | 101072804 | 10/2011 |

* cited by examiner

*Primary Examiner* — Jack W Keith
*Assistant Examiner* — Sean P Burke
(74) *Attorney, Agent, or Firm* — Cantor Colburn LLP (57) ABSTRACT

Disclosed is a heat exchanger for a passive residual heat removal system, which improves heat transfer efficiency by expanding a heat transfer area. A heat exchange tube includes a first member connected to a steam pipe through which steam generated from a steam generator of a nuclear reactor circulates, and a second member connected to both of the first member and a feed water pipe used to supply water to the steam generator provided in the nuclear reactor, and the first member has the shape different from that of the second member, thereby expanding the heat transfer area so that the heat transfer efficiency is improved.

7 Claims, 6 Drawing Sheets

HEAT EXCHANGER FOR PASSIVE RESIDUAL HEAT REMOVAL SYSTEM

BACKGROUND OF THE INVENTION

1. Field of the Invention

The present invention relates to a heat exchanger for a passive residual heat removal system. In more particular, the present invention relates to a heat exchanger for a passive residual heat removal system, capable of improving heat transfer efficiency by expanding a heat transfer area.

2. Description of the Related Art

Unlike a typical boiler, a nuclear reactor generates residual heat from the core thereof during the significant time periods after the nuclear reactor is stopped due to an accident, and the residual heat generated from the core is rapidly reduced as time elapses after the nuclear reactor is stopped.

A passive residual heat removal system has been employed for various nuclear reactors including an integral nuclear reactor, and used in order to remove the heat (the sensible heat of the nuclear reactor and the latent heat of the core) of the nuclear reactor upon the emergency situation such as an accident. In particular, a heat exchanger for the passive residual heat removal system transfers the heat received therein from the nuclear reactor to the outside (heat sink in the final step). The heat exchanger mainly employs a condensation heat exchanger based on a steam condensation phenomenon while representing the superior heat transfer efficiency.

The heat exchangers applied to most nuclear reactors employing the passive residual heat removal system are based on a water-cooled scheme as an external cooling scheme. However, some nuclear reactors employ heat exchangers based on an air-cooled scheme or both of the water-cooled scheme and the air-cooled scheme.

A water-cooled type heat exchanger represents superior cooling efficiency, so that the heat exchanger can be manufactured in small size. However, upon the accident, the water stored in an emergency cooling tank must be periodically supplemented. In addition, according to the water-cooled type condensation heat exchanger, a single phase heat transfer phenomenon is represented after steam has been condensed, so that a heat transfer coefficient is reduced. Accordingly, even if the tube length of the heat exchanger is increased, the variation of the heat transfer performance may not be greatly represented.

In contrast, according to an air-cooled type condensation heat exchanger, the emergency cooling tank is not used, and water may not be periodically supplemented. However, inferior cooling efficiency is represented, so that a large-capacity heat exchanger must be manufactured. Accordingly, the unit price of the heat exchanger is greatly increased. In addition, according to the air-cooled type condensation heat exchanger, since the heat is transferred to the outside (air) through the tube wall surface, the whole performance of the heat exchanger depends on the heat transfer efficiency of the tube wall surface (air).

Examples of the above technologies are disclosed in patent document 1 (Korean Unexamined Patent Publication No. 2010-0090990) and patent document 2 (Korean Unexamined Patent Publication No. 2009-0102079).

For example, patent document 1 discloses a passive residual heat removal system for an integral-type nuclear reactor, which communicates with a main feed water pipe and a main steam pipe connected to a steam generator so that the residual heat is removed from the integral-type nuclear reactor upon an accident. The passive residual heat removal system includes a condensation heat exchanger, which has an upper portion connected to a steam supply pipe communicating with the main steam pipe and a lower portion connected to a cooling discharge pipe, and a main valve which connects a cooling collect pipe, which communicates with the main feed water pipe, to the cooling discharge pipe and has a water receiving space formed in the operation thereof.

In addition, patent document 2 discloses a passive residual heat removal system provided with a heat pipe heat exchanger. The passive residual heat removal system includes the heat pipe exchanger connected with a decay heat exchanger through a high-temperature pipe of a sodium loop for the removal of heat to discharge the decay heat transferred thereto through the high-temperature pipe to the outside, and a sodium-air heat exchanger connected with the heat pipe heat exchanger through the high-temperature pipe to discharge the decay heat transferred thereto through the high-temperature pipe to the outside.

SUMMARY OF THE INVENTION

However, in the heat exchanger for the passive residual heat removal system employing both of the water-cooled type and the air-cooled type, the residual heat of the core still remains significantly even at the time point of switching the water-cooled type to the air-cooled type. Accordingly, in order to properly remove the residual heat, a middle-capacity/large-capacity heat exchanger is required.

The present invention has been made to solve the problems occurring in the prior art, an object of the present invention is to provide a heat exchanger for a passive residual heat removal system capable of effectively removing the residual heat radiated from the core by taking the characteristics of water-cooled and air-cooled schemes into consideration when the nuclear reactor is stopped due to the accident.

Another object of the present invention is to provide a heat exchanger for a passive residual heat removal system, in which a heat transfer tube constituting the heat exchanger includes a spiral tube to greatly expand the heat transfer area while increasing the mixing of the fluid at the outside of the heat transfer tube, so that the heat transfer efficiency can be improved.

Still another object of the present invention is to provide a heat exchanger for a passive residual heat removal system, capable of minimizing the cost increase, facilitating maintenance, and effectively increasing the heat transfer efficiency and the stability through the combination of the water-cooled scheme and the air-cooled scheme In order to accomplish the above objects of the present invention, there is provided a heat exchanger for a passive residual heat removal system to cool a core of a nuclear reactor. The heat exchanger includes an emergency cooling tank in which water is received, a housing inserted into the emergency cooling tank, and a heat exchange tube inserted into the housing. The heat exchange tube includes a first member connected to a steam pipe through which steam generated from a steam generator of the nuclear reactor circulates, and a second member connected to both of the first member and a feed water pipe used to supply water to the steam generator provided in the nuclear reactor, and the first member has a shape different from a shape of the second member.

As described above, according to the passive residual heat removal system of the present invention, the heat exchange tube is wholly formed in the shape of the spiral tube, or formed in the mixed shape of the spiral tube and the straight tube, thereby expanding the heat transfer area. Accordingly, the heat transfer efficiency can be improved.

In addition, according to the passive residual heat removal system of the present invention, since the flow of fluid (air or water) is greatly increased around the spiral tube (upper spiral tube or lower spiral tube) due to the housing formed therein with the through holes, the heat transfer efficiency can be more improved.

The heat exchange tube having the shape of the spiral tube is manufactured, so that the heat exchange tube representing the superior heat transfer performance can be installed in the confined space, and the superior heat exchange performance can be obtained even if the size of the heat exchanger is reduced. Accordingly, the economical advantage can be obtained.

In addition, the heat exchange tube having the outer appearance simpler than that of the typical air-cooled heat exchanger is applied, so that the maintenance of the heat exchanger can be easily performed.

Further, in the case of entering the air-cooled type cooling step, even if the water is not supplemented into the emergency cooling tank from the outside, the nuclear reactor can be safely maintained through the air-cooled scheme for a long time. Accordingly, the safety of the nuclear reactor can be significantly improved.

DETAILED DESCRIPTION OF THE INVENTION

The above and other objects, features and other advantages of the present invention will be more clearly understood from the following detailed description when taken in conjunction with the accompanying drawings.

Hereinafter, a heat exchanger for a passive residual heat removal system according to the embodiment of the present invention will be described with reference to accompanying drawings.

Figure 1:
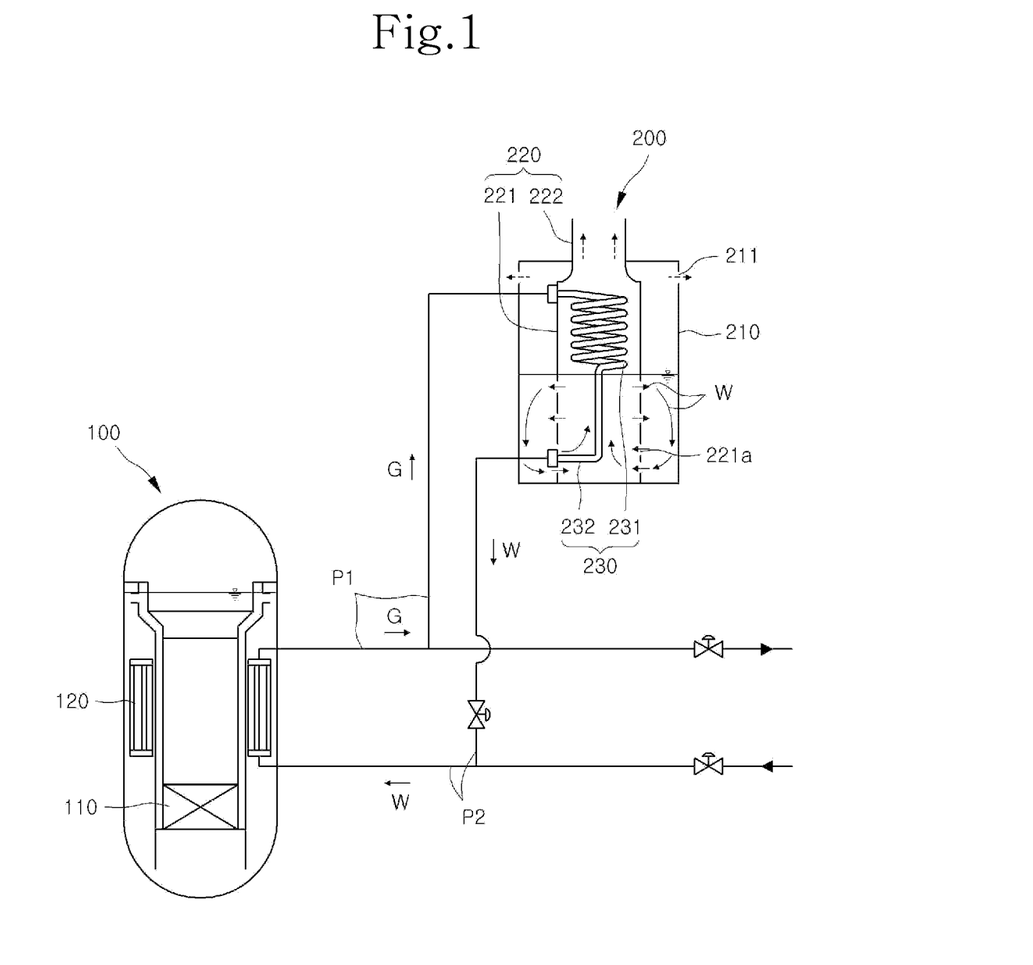
FIG. 1 is a view showing the structure of a passive residual heat removal system according to the present invention in which the level of water stored in an emergency cooling tank reaches the upper end portion of a straight tube.
Figure 2:
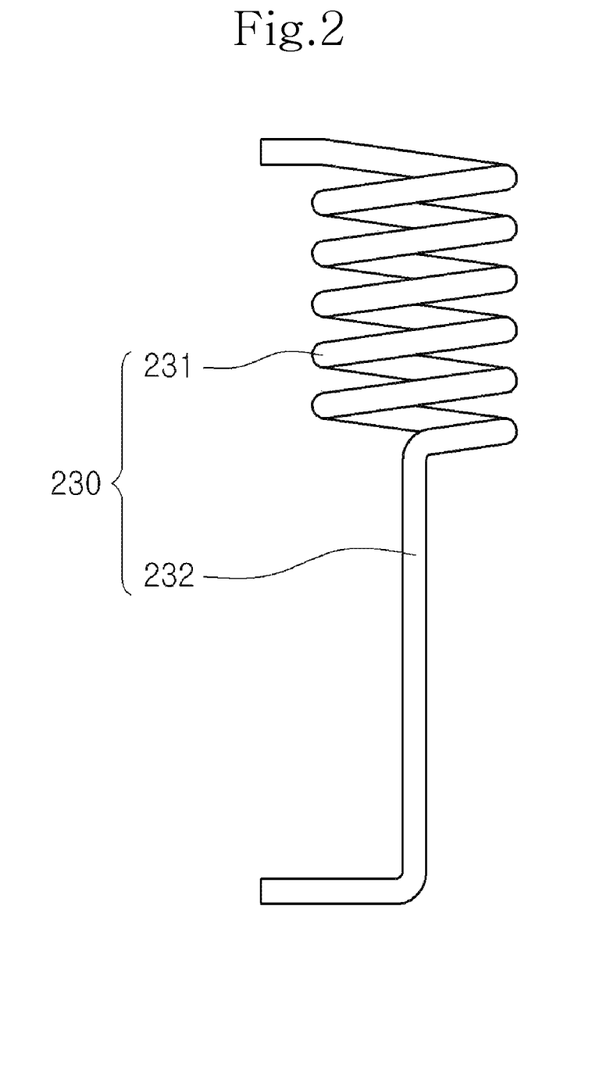
FIG. 2 is a perspective view showing a heat exchange tube provided in a heat exchanger for the passive residual heat removal system according to the first embodiment of the present invention.

FIG. 1 is a view showing the structure of a passive residual heat removal system according to the present invention in which the level of water stored in an emergency cooling tank reaches the upper end portion of a straight tube. FIG. 2 is a perspective view showing a heat exchange tube provided in a heat exchanger for the passive residual heat removal system according to the first embodiment of the present invention.

As shown in FIG. 1, a heat exchanger 200 for the passive residual heat removal system according to the present invention is connected to a nuclear reactor 100, and includes an emergency cooling tank 210, a housing 220 inserted into the emergency cooling tank 210, and a heat exchange tube 230 inserted into the emergency cooling tank 210. A plurality of steam circulation holes 211 are provided at an upper lateral side of the emergency cooling tank 210.

The nuclear reactor 100 includes a core 110 and a steam generator 120 to decrease the temperature of the core 110. The core 110 and the steam generator 120 are submerged under water as shown in FIG. 1.

As shown in FIG. 1, the heat exchanger 200 is connected to a steam pipe P1, through which steam generated from the steam generator 120 of the nuclear reactor 100 circulates, and connected to a feed water pipe P2 used to supply water W to the steam generator 120 provided in the nuclear reactor 100.

The housing 220 is installed in the emergency cooling tank 210 to surround the heat exchange tube 230 installed in the emergency cooling tank 210. The housing 220 has open upper and lower ends, and includes a body 221 and an exhaust part 222 integrally formed with the body 221 at the upper end of the body 221.

The body 221 surrounds the heat exchange tube 230 and has open upper and lower ends. The body 221 is provided at the lower lateral side thereof with through holes 221a.

The exhaust part 222 communicates with the body 221, and passes through the upper portion of the emergency cooling tank 210 so that the end portion of the exhaust part 222 is positioned at the outside of the emergency cooling tank 210. In addition, the exhaust part 222 has a diameter which is gradually reduced upward from the upper end of the body 221 and then maintained in a uniform size. The exhaust part 222 is a passage to discharge the steam out of the housing 220 when the internal water W of the body 222 is evaporated by the high-temperature steam G supplied from the steam generator 120. In this case, the body 221 serves as a guide passage allowing air around the heat exchange tube 230 to smoothly flow. The body 221 may various shapes sufficient to perform the function of the guide passage. In addition, when the internal water W of the body 221 is evaporated, the steam is exhausted through the steam circulation hole 211.

As shown in FIG. 1, the water W received in the emergency cooling tank 210 is filled to the central portion of the body 221. If the through holes 221a are submerged under the water W, the water W circulates to the inside and the outside of the body 221 through the through holes 221a. If the level of the water W received in the emergency cooling tank 210 is lowered, some through holes 221a are exposed out of the water W, and air circulates through the exposed through holes 221a.

The steam G generated from the inner part of the steam generator 120 of the nuclear reactor 100 is introduced into the heat exchanger 200 for the passive residual heat removal system according to the present invention. Then, the steam G heat-exchanged by the heat exchanger 200 is changed to moisture to be introduced into the steam generator 120 of the nuclear reactor 100. To this end, as shown in FIG. 1, the feed water pipe P2 is provided thereon with an isolation valve or a feed water isolation valve for the passive residual heat removal system. In addition, the steam pipe P1 is provided thereon with a steam isolation valve to control the exhaust of the steam generated from the steam generator 120.

The nuclear reactor 100 receives therein cooling water to cool the core 110, and the steam generator 120 is installed to generate steam. The steam G generated from the steam generator 120 is introduced into the heat exchanger 200 through the steam pipe P1 by the steam isolation valve. In addition, the heat exchanger 200 is connected to the steam generator 120 of the nuclear reactor 100 through the feed water pipe P2 so that the water W cooled by the heat exchanger 200 is supplied to the steam generator 120.

If the high-temperature steam G generated from the steam generator 120 is introduced into the heat exchanger 200 through the steam pipe P1, the water W in the emergency cooling tank 210 is heated and evaporated by the high-temperature steam G. The evaporated steam is discharged out of the emergency cooling tank 210 through the steam circulation holes 211.

The heat exchange tube 230 is received in the housing 220. One end of the heat exchange tube 230 is connected to the steam pipe P1, and an opposite end of the heat exchange tube 230 is connected to the feed water pipe P2. Accordingly, the high-temperature steam G generated from the steam generator 120 is introduced into the heat exchange tube 230 through the steam pipe P1, so that the steam G exchanges heat with the water stored in the emergency cooling tank 210.

As shown in FIG. 2, the heat exchange tube 230 performing the above function includes a first member connected to the steam pipe P1 and a second member which is connected to both of the first member and the feed water pipe P2. The first member has the shape different from that of the second member.

As shown in FIG. 1, if the emergency cooling tank 210 is half filled with water, the second member of the heat exchange tube 230 is submerged under the water W to serve as a part to perform a water-cooled scheme, and the first member of the heat exchange tube 230 is exposed to the air to serve as a part to perform an air-cooled scheme. Since the air-cooled scheme represents the heat transfer efficiency inferior to that of the water-cooled scheme, the first member exposed to the air includes a spiral tube 231, and the second member includes a straight tube 232 according to the first embodiment as shown in FIG. 2.

One end of the spiral tube 231 is connected to the steam pipe P1, and an opposite end of the spiral tube 231 is connected to the straight tube 232. The spiral tube 231 is formed with a large number of spiral turns per length so that the heat transfer area can be expanded.

Accordingly, the water W stored in the emergency cooling tank 210 is stored only up to the straight tube 232, so that the straight tube 232 performs the water-cooled scheme, and the spiral tube 231 corresponding to the upper portion of the straight tube 232 is not filled with the water W, so that the spiral tube 231 performs the air-cooled scheme. In this case, even if the straight tube 232 rapidly exchanges heat with the water W, and the spiral tube 231 represents the degraded heat efficiency due to the air-cooled scheme, heat transfer with the air is rapidly performed due to the wide surface area.

One end of the straight pipe 232 is connected to the opposite end of the spiral tube 231, and an opposite end of the straight end 232 is connected to the feed water pipe P2.

If the first member of the heat exchange tube 230 is formed in the shape of a spiral tube, the heat transfer area is expanded, so that heat can be effectively transferred between the high-temperature steam and the water W received in the emergency cooling tank 210, or between the high-temperature steam and the external circulating air.

Hereinafter, description will be made regarding the standard calculation of the heat exchanger for the passive residual heat removal system including the mixed type of the spiral tube 231 and the straight tube 232 according to the first embodiment. Meanwhile, the standard will be described only for the illustrative purpose, but the invention is not limited thereto.

For instance, the main specifications of the heat exchanger for the passive residual heat removal system (water-cooled type) applied to a system-integrated modular advanced reactor (SMART, rated power of 330 MWt) according to the present invention are as follows.

1) Number of Heat Exchangers: 4
2) Diameter of Heat Exchanger: 0.84 m
3) Height of Heat Exchanger (except for header): 1.5 m In addition, following main assumptions are made in order to calculate the size of the heat exchanger for the passive residual heat removal system (water-cooled type/air-cooled type) applicable to the SMART.

1) Only the heat transfer derived from the natural convection occurring outside a tube is taken into consideration (critical path).
2) Water in the emergency cooling tank is completely depleted after 72 hours (air-cooled type).
3) Other main input values used to calculate the size of the heat exchanger are the same as those of the heat exchanger of the SMART passive residual heat removal system.

Following table 1 shows the size calculation results of the heat exchanger for the passive residual heat removal system based on the SMART having the rated power of 330 MWt. If the heat exchanger operates in the air-cooled type after 72 hours have elapsed, a spiral tube having the height of about 1.9 m and the rotational diameter of 2 m may be required in addition to the existing straight tube in order to maintain the cooling performance.

In this case, the whole height of the heat exchanger is about 3.4 m which may be twice higher than that of the straight tube-type heat exchanger (water-cooled type) applied to the SMART. Meanwhile, if the straight tube provided at the lower portion of the heat exchanger is substituted with the spiral tube, the whole height of the heat exchanger is reduced to about 2.1 m, so that the heat exchanger may be provided in size similar to that of the existing straight tube-type heat exchanger operating in the water-cooled type.

TABLE 1

| Structure of Heat Exchanger | Size of Heat Exchanger* | |
|---|---|---|
| | Diameter | Height |
| Wholly-straight tube typed | 0.84 m | 16.88 m (33.76 m)** |
| Mixed type of straight tube + spiral tube | 2 m | 3.46 m (5.61 m)** |
| Wholly-spiral tube typed | 2 m | 2.15 m (4.30 m)** |

In table 1, *) heat exchanger is sized on the basis of the rotational diameter of a spiral tube=2 m, the pitch of the spiral tube=0.8 m, the temperature of a heat exchanger=200° C., an ambient air temperature=40° C., a heat transfer coefficient=5 W/m²K, and the residual heat of the SMART nuclear reactor after 72 hours (0.54% of normal power), and **) value between brackets represents the size of a heat exchanger obtained by taking the initiating event and the single failure into consideration.

Hereinafter, the structure of a heat exchange tube 230 according to a second embodiment of the present invention will be described with reference to FIG. 3.

Figure 3:
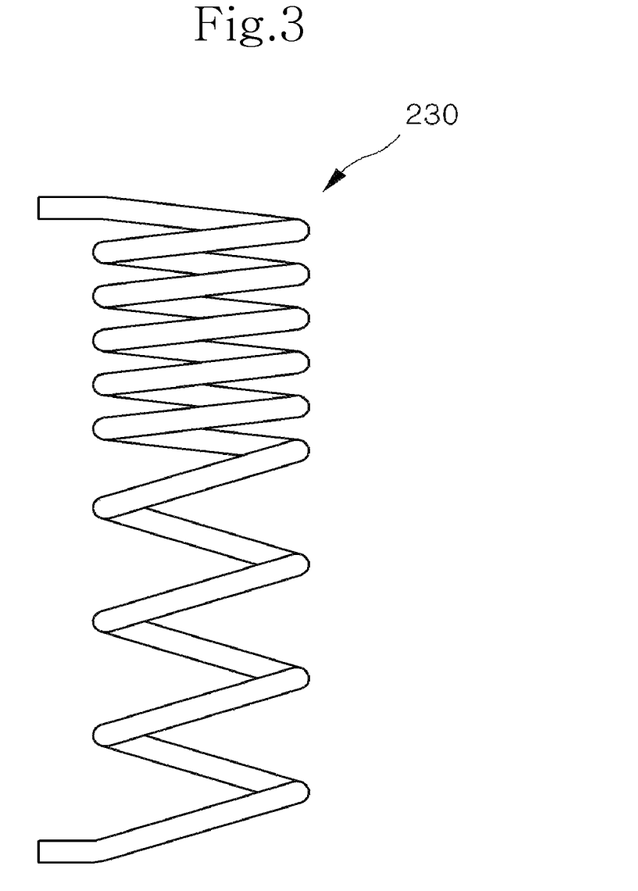
FIG. 3 is a perspective view showing the heat exchange tube provided in a heat exchanger in a passive residual heat removal system according to the second embodiment of the present invention.

FIG. 3 is a perspective view showing the heat exchange tube 230 provided in a heat exchanger in a passive residual heat removal system according to the second embodiment of the present invention.

As shown in FIG. 3, the heat exchange tube 230 according to the second embodiment has first and second members having the shape of a spiral tube (including an upper spiral tube and a lower spiral tube). In other words, the first member exposed to the air has the number of spiral turns per length greater than the number of spiral turns per length provided at the second member submerged under the water W, so that the first member is denser than the lower portion of the heat exchanger, thereby expanding the heat transfer area.

According to the second embodiment, the problem caused in the air-cooled scheme representing the degraded heat transfer efficiency can be complemented. In other words, if the first and second members of the heat exchange tube 230 are formed in the shape of a spiral tube, the heat transfer area is expanded, so that heat is effectively transferred between the high-temperature steam and the water W received in the emergency cooling tank 210, or between the external circulating air and the high-temperature steam.

Hereinafter, the structure of a heat exchange tube 230 according to a third embodiment of the present invention will be described with reference to FIG. 4.

Figure 4:
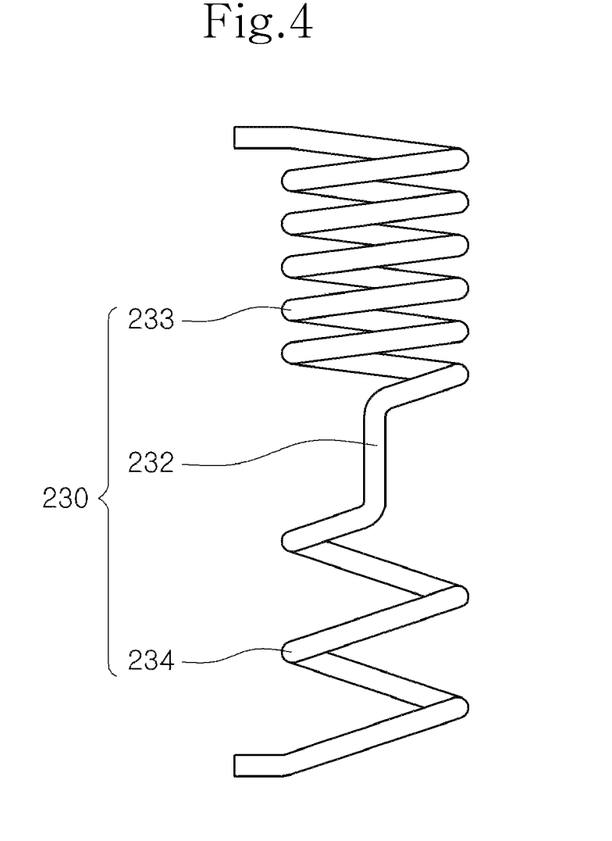
FIG. 4 is a perspective view showing the heat exchange tube provided in a heat exchanger in a passive residual heat removal system according to the third embodiment of the present invention.

FIG. 4 is a perspective view showing the heat exchange tube 230 provided in a heat exchanger in a passive residual heat removal system according to the third embodiment of the present invention.

As shown in FIG. 4, the heat exchange tube 230 according to the third embodiment has a first member including a first spiral tube and a second member including a straight tube and a second spiral tube connected to the straight tube. In other words, the heat exchange tube 230 according to the third embodiment includes an upper spiral tube 233 serving as the first spiral tube, a straight tube 232 integrally formed with the upper spiral tube 233, and a lower spiral tube 234 serving as the second spiral tube integrally formed with the straight tube 232.

One end of the upper spiral tube 233 is connected to the steam pipe P1, one end of the straight tube 232 is connected to an opposite end of the upper spiral tube 233, one end of the lower spiral tube 234 is connected to an opposite end of the straight tube 232, and an opposite end of the lower spiral tube 234 is connected to the feed water pipe P2.

Since the upper and lower spiral tubes 233 and 234 have the spiral shape, the heat transfer area can be enlarged, so that the heat transfer enhancement can be achieved as described above.

The upper and lower spiral tubes 233 and 234 are the same in that the upper and lower spiral tubes 233 and 234 have the spiral shape. However, the upper spiral tube 233 is greater than the lower spiral tube 234 in terms of the number of the spiral turns per length. In other words, the upper spiral tube 233 has a shape denser than that of the lower spiral tube 234. Accordingly, the efficiency of the air-cooled scheme inferior to the efficiency of the water-cooled scheme as described above can be supplemented.

Meanwhile, although the heat exchanger 200 for the passive residual heat removal system according to the present invention has been described in that the heat exchange tube 230 installed in the emergency cooling tank 210 of the heat exchanger 200 is connected to the steam generator 120 through the steam pipe P1 and the feed water pipe P2, the heat exchange tube 230 may be directly connected to the inner part of the nuclear reactor 100 without the connection to the steam generator 120 by providing additional pipes connected to the lower and upper lateral sides of the nuclear reactor 100.

In addition, although the embodiment has been described regarding the shape of the heat exchange tube 230, the present invention is not limited thereto. In other words, the heat exchange tube 230 may be constructed to have a plurality of radiation fins installed therein so that the efficiency of the air-cooled scheme may be enhanced.

Figure 5:
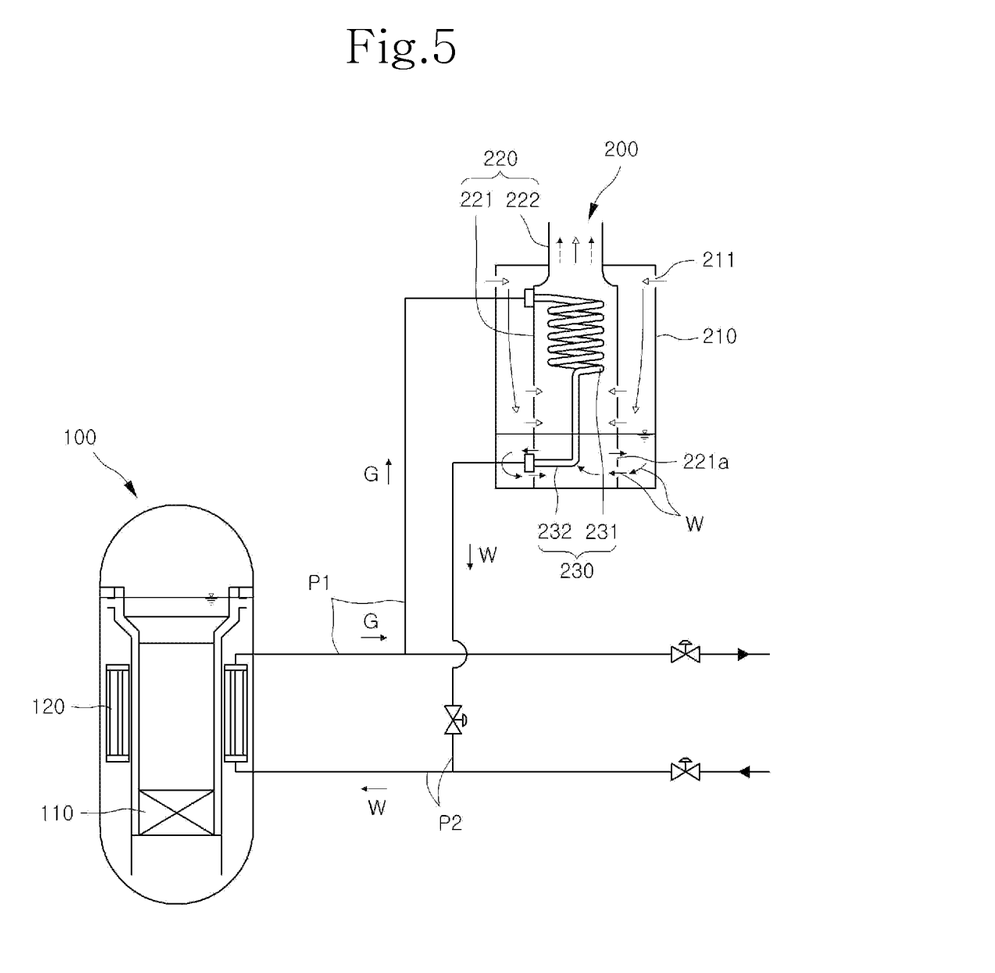
FIG. 5 is a view showing the state that the level of the water stored in the emergency cooling tank reaches the central portion of the straight tube according to the first embodiment.
Figure 6:
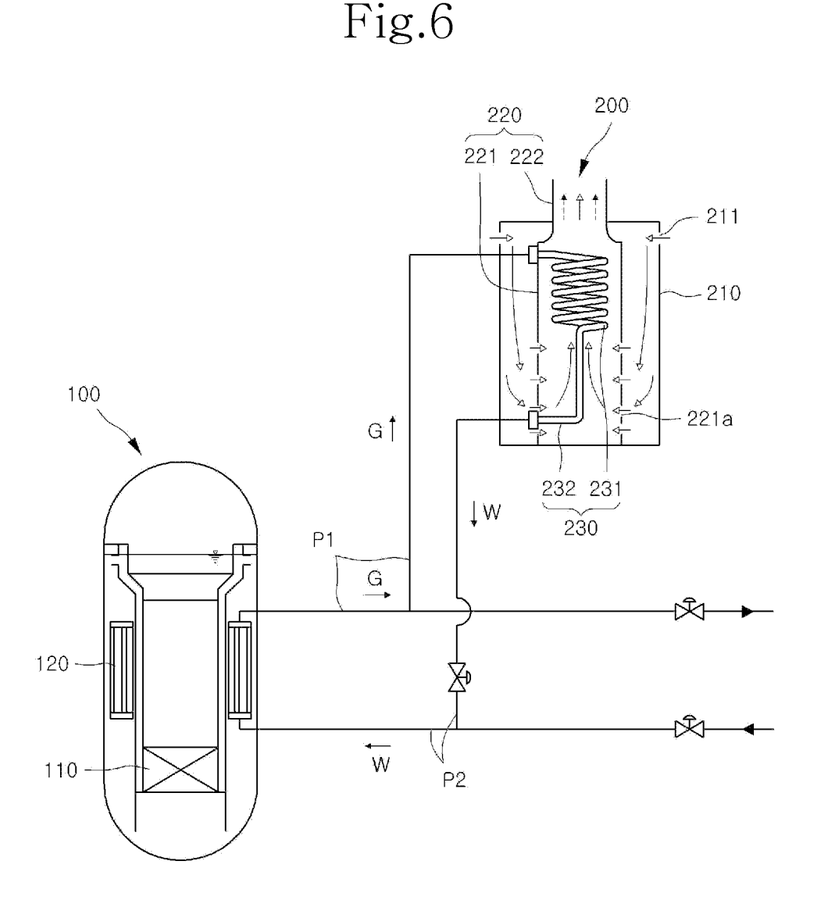
FIG. 6 is a view showing the state that water is not stored in the emergency cooling tank according to the first embodiment.

Hereinafter, the operation of the heat exchanger 200 for the passive residual heat removal system according to the present invention having the above structure will be described briefly with reference to FIGS. 1, 5, and 6. In addition, although the following description is made based on the first embodiment, the present invention is not limited thereto. In other words, the following description is applicable to the second embodiment or the third embodiment.

If the emergency situation occurs in the nuclear reactor 100, low-temperature water W is supplied to the generator 120 through the feed water pipe P2 connected to the heat exchanger 200.

Simultaneously, the steam generator 120 generates high-temperature steam G, and the high-temperature steam G is introduced into the heat exchange tube 230 of the heat exchanger 200 through the steam pipe P1.

If the high-temperature steam G is introduced into the heat exchange tube 230 as described above, the high-temperature steam G and the low-temperature water W stored in the emergency cooling tank 210 exchange heat with each other through the heat exchange tube 230.

As shown in FIG. 1, when the level of the water W stored in the emergency cooling tank 210 reaches the upper end portion of the straight tube 232, the straight tube 232 submerged under the water W exchanges heat with the water W stored in the emergency cooling tank 210, and the spiral tube 231 exchanges heat with the air. In this case, the water W stored in the emergency cooling tank 210 reciprocates to the inside and the outside of the body 221 via the through holes 221a formed in the body 221 of the housing 220 while exchanging heat with the high-temperature steam G provided in the straight tube 232.

In addition, the steam generated in the process of heat exchange is discharged to the outside of the emergency cooling tank 210 through the steam circulation holes 211 formed in the emergency cooling tank 210 and the exhaust part 222 of the housing 220.

If the level of the water W stored in the emergency cooling tank 210 is gradually lowered through the above procedure (see FIGS. 5 and 6), the external air is introduced into the emergency cooling tank 210 through the steam circulation holes 211 of the emergency cooling tank 210. In other words, since the temperature of the emergency cooling tank 210 is increased higher than the external temperature due to the high-temperature steam, the external air is introduced into the emergency cooling tank 210.

The external air introduced into the emergency cooling tank 210 is introduced into the body 221 through the through holes 221a formed in the body 221 of the housing 220, and the introduced external air exchanges heat with the heat exchange tube 230 including the first and second members. The high-temperature air generated through the heat exchange procedure is discharged to the outside of the emergency cooling tank 210 through the exhaust part 222 of the housing 220.

The present invention is not limited to the above-described embodiment, and may be variously modified by those skilled in the art to which the present invention pertains without departing from the spirit of the present invention and the modification falls within the scope of the present invention.

What is claimed is:
1. A heat exchanger for a passive residual heat removal system to cool a core of a nuclear reactor, the heat exchanger comprising:
   an emergency cooling tank in which water is received;

a housing disposed inside the emergency cooling tank, the housing including an upper portion and a lower portion, wherein an exhaust port is formed in the upper portion of the housing, and through holes are formed at the lower portion of the housing; and a heat exchange tube disposed inside the housing, wherein the heat exchange tube includes a first member positioned corresponding to the upper portion of the housing and a second member positioned corresponding the lower portion of the housing, the first member being connected to a steam pipe through which steam generated from a steam generator of the nuclear reactor circulates, and a second member connected to both of the first member and a feed water pipe used to supply water to the steam generator provided in the nuclear reactor, and the first member has a shape different from that of the second member, and wherein the water is filled to a level of the lower portion of the housing and flows between the emergency cooling tank and the housing through the through holes, and air is filled above the water, so that the steam flowing the first member is air-cooled and the steam flowing the second member is water-cooled.

2. The heat exchanger of claim 1, wherein the first member includes a spiral tube, and the second member includes a straight tube.

3. The heat exchanger of claim 1, wherein the first and second members include spiral tubes, and the first member has spiral turns per length greater than those of the second member.

4. The heat exchanger of claim 1, wherein the first member includes a first spiral tube, and the second member includes a straight tube and a second spiral tube connected to the straight tube.

5. The heat exchanger of claim 4, wherein the first spiral tube has spiral turns per length greater than those of the second spiral tube.

6. The heat exchanger of claim 1, wherein the housing has a lower end.

7. The heat exchanger of claim 1, wherein a heat radiation fin is installed in the heat exchange tube.

* * * * *